United States Patent
Kim

(10) Patent No.: US 10,602,334 B2
(45) Date of Patent: Mar. 24, 2020

(54) DISPENSER CONNECTIVITY

(71) Applicant: The Coca-Cola Company, Atlanta, GA (US)

(72) Inventor: Kyusang Kim, Atlanta, GA (US)

(73) Assignee: The Coca-Cola Company, Atlanta, GA (US)

( * ) Notice: Subject to any disclaimer, the term of this patent is extended or adjusted under 35 U.S.C. 154(b) by 0 days.

(21) Appl. No.: 15/764,056

(22) PCT Filed: Sep. 27, 2016

(86) PCT No.: PCT/US2016/053961
§ 371 (c)(1),
(2) Date: Mar. 28, 2018

(87) PCT Pub. No.: WO2017/058794
PCT Pub. Date: Apr. 6, 2017

(65) Prior Publication Data
US 2018/0288594 A1    Oct. 4, 2018

Related U.S. Application Data

(60) Provisional application No. 62/234,078, filed on Sep. 29, 2015.

(51) Int. Cl.
*H04W 4/80*    (2018.01)
*G06Q 20/18*   (2012.01)
(Continued)

(52) U.S. Cl.
CPC .............. *H04W 4/80* (2018.02); *G06Q 20/18* (2013.01); *G06Q 20/327* (2013.01);
(Continued)

(58) Field of Classification Search
CPC ................. G07F 11/002; G07F 13/065; B67D 1/00–0041; G06Q 20/3278
(Continued)

(56) References Cited

U.S. PATENT DOCUMENTS 9,646,314 B2 * 5/2017 Moore .................... G06Q 30/02
9,955,289 B1 * 4/2018 Liu .......................... A61N 1/025
(Continued)

FOREIGN PATENT DOCUMENTS

KR      10-1500981 B1    3/2015

OTHER PUBLICATIONS

International Search Report and Written Opinion for PCT/US2016/053961, dated Jan. 2, 2017.
(Continued)

*Primary Examiner* — Edward F Urban
*Assistant Examiner* — Rui M Hu
(74) *Attorney, Agent, or Firm* — Merchant & Gould P.C.

(57) ABSTRACT

Device authentication may be provided. A mobile computing device may read a device ID from a dispensing device (e.g., a beverage dispenser, kiosk, ATM, etc.) wirelessly when the mobile computing device is placed in close proximity to the dispensing device. The mobile computing device may send the device ID along with a user ID to a server in a notification from the mobile computing device. Using the user ID, the server may look up user preferences from a table on the server. User preferences may be sent from the mobile computing device to the server. The server may send the user preferences to the dispensing device that corresponds to the device ID. In response, the dispensing device may display a customized user interface based upon the user preferences.

7 Claims, 11 Drawing Sheets

(51) Int. Cl.
  *G07F 11/00*    (2006.01)
  *G07F 13/06*    (2006.01)
  *G06Q 20/32*    (2012.01)
  *H04W 76/14*    (2018.01)
  *H04L 29/08*    (2006.01)
  *H04W 84/12*    (2009.01)

(52) U.S. Cl.
  CPC ......... *G06Q 20/3276* (2013.01); *G07F 11/00* (2013.01); *G07F 13/06* (2013.01); *H04W 76/14* (2018.02); *H04L 67/306* (2013.01); *H04W 84/12* (2013.01)

(58) Field of Classification Search
  USPC ........................................................ 455/41.3
  See application file for complete search history.

(56) References Cited

U.S. PATENT DOCUMENTS

| | | | | |
|---|---|---|---|---|
| 2003/0191558 A1* | 10/2003 | Arellano | ............... | G06Q 10/087 700/237 |
| 2008/0090520 A1* | 4/2008 | Camp | ...................... | H04B 5/00 455/41.2 |
| 2009/0065570 A1* | 3/2009 | Peters | ................... | B67D 1/0041 235/378 |
| 2009/0166375 A1* | 7/2009 | Butler | ................... | G06Q 20/123 221/282 |
| 2009/0177318 A1* | 7/2009 | Sizemore | ................ | G07F 9/026 700/236 |
| 2009/0227282 A1* | 9/2009 | Miyabayashi | ...... | H04L 63/0492 455/552.1 |
| 2010/0125362 A1 | 5/2010 | Canora et al. | | |
| 2011/0070828 A1* | 3/2011 | Griffin | ................ | H04M 1/7253 455/41.1 |
| 2012/0117389 A1* | 5/2012 | Sarmenta | ........... | G06K 19/0723 713/190 |
| 2013/0054016 A1* | 2/2013 | Canter | ............... | G06Q 30/0269 700/237 |
| 2013/0106690 A1 | 5/2013 | Lim | | |
| 2014/0179231 A1* | 6/2014 | Charania | ............... | G07F 11/002 455/41.2 |
| 2014/0295754 A1* | 10/2014 | Lortz | ................... | H04B 5/0031 455/41.1 |
| 2014/0297026 A1 | 10/2014 | Peters, Jr. et al. | | |
| 2015/0039776 A1* | 2/2015 | Jarnagin, III | ......... | H04L 67/141 709/228 |
| 2015/0046877 A1 | 2/2015 | Cuppari et al. | | |
| 2015/0069087 A1* | 3/2015 | Brown | ................. | B67D 1/0021 222/129.1 |
| 2015/0082243 A1 | 3/2015 | Taylor et al. | | |
| 2015/0106196 A1 | 4/2015 | Williams et al. | | |
| 2015/0163846 A1* | 6/2015 | Weizman | .......... | H04W 52/0225 455/41.2 |
| 2016/0065764 A1* | 3/2016 | Kang | ....................... | H04N 1/00 358/1.13 |
| 2016/0132120 A1* | 5/2016 | Fan | ......................... | G06F 3/017 348/150 |
| 2016/0325980 A1 | 11/2016 | Sawhney et al. | | |
| 2018/0131408 A1* | 5/2018 | Austad | ................. | H04W 76/14 |

OTHER PUBLICATIONS

Search Report for European Patent Application No. 16852412.2, dated Mar. 27, 2019.

* cited by examiner

DISPENSER CONNECTIVITY

This application is a National Stage application of PCT International Patent Application No. PCT/US2016/053961, filed Sep. 27, 2016, which claims priority to U.S. Provisional patent application Ser. No. 62/234,078, filed Sep. 29, 2015, which applications are incorporated herein by reference. To the extent appropriate, a claim of priority is made to each of the above disclosed applications.

BACKGROUND

A beverage dispenser may be a device that dispenses carbonated or still soft drinks called fountain drinks. They may be found in restaurants, concession stands, and other locations such as convenience stores. A beverage dispenser may combine flavored syrup or syrup concentrate with still or water to make soft drinks that are dispensed into a consumer's cup. The syrup may be pumped from a special container called a bag-in-box (BIB). Other beverage dispensers may combine multiple unsweetened beverage ingredient concentrates along with a sweetener and still or carbonated water to make soft drinks that are dispensed into a consumer's cup. The beverage ingredient concentrates may be pumped from a cartridge or carton that contains a pouch of the beverage ingredient concentrate. Vending machines may dispense pre-packaged beverages.

SUMMARY

This Summary is provided to introduce a selection of concepts in a simplified form that may be further described below in the Detailed Description. This Summary is not intended to be used to limit the scope of the claimed subject matter.

Device identification may be provided. Consistent with embodiments, a user may read a device ID from a dispensing device (e.g., a beverage dispenser like a fountain or post-mix beverage dispenser, kiosk, ATM, point-of-sale device, etc.) wirelessly with a mobile computing device when the mobile computing device is placed in close proximity to the dispensing device. The mobile computing device may send the device ID along with a user ID to a server in a notification from the mobile computing device. Using the user ID, the server may look up user preferences from a table on the server. Consistent with embodiments, rather than looking the user preferences up on the server, the user preferences may be sent from the mobile computing device to the server. The server may send the user preferences to the dispensing device that corresponds to the device ID. In response, the dispensing device may display a customized user interface based upon the user preferences.

In one aspect, a method includes: transmitting, by a dispensing device, a wireless signal from the dispensing device in close proximity to the dispensing device, the wireless signal including a device identification of the dispensing device; receiving, at the dispensing device, an event notification, the event notification associated with a mobile device that received the wireless signal in close proximity to the dispensing device; and displaying, in response to the event notification, a customized user interface, the customized user interface based on preference data or profile data included in the event notification, the preference data or profile data associated with a user of the mobile device.

In another aspect, a dispensing device includes: a display configured to enable interaction with the dispensing device; a first wireless communication module configured to broadcast a wireless signal in close proximity to the dispensing device based on a first wireless communication protocol, wherein the wireless signal comprises a device identification of the dispensing device; a second communication module configured to receive an event notification associated with a mobile device that received the wireless signal in close proximity to the dispensing device; a memory storage; and a processing unit coupled to the memory storage, wherein the processing unit is operative to: display a customized user interface on the display, the customized user interface based on preference data or profile data included in the event notification, the preference data or profile data associated with a user of the mobile device.

In yet another aspect, a method includes: receiving, by a mobile computing device, a device identification when the mobile computing device is in close proximity to a dispensing device; obtaining, by the mobile computing device, first connection data for connecting to the dispensing device based on the device identification; creating, by the mobile computing device, a first connection with the dispensing device based on the first connection data; and transmitting, by the mobile computing device over the first connection, an event notification to the dispensing device, the event notification comprising preference data or profile data corresponding to a user of the mobile computing device.

In a further aspect, a method includes: receiving, by a beverage dispenser, a connection request from a mobile computing device over a first communication path when the mobile computing device is in proximity to the beverage dispenser; creating, by the beverage dispenser, a second communication path between the beverage dispenser and the mobile computing device, the second communication path being different from the first communication path; and exchanging data between the beverage dispenser and the mobile computing device via the second communication path.

In another aspect, a method includes: detecting, by a mobile computing device, a proximity of a beverage dispenser; accessing, by the mobile computing device, an application on the mobile computing device, the application having pre-loaded credentials; and using the pre-loaded credentials to establish a communication path with the beverage dispenser.

BRIEF DESCRIPTION OF THE DRAWINGS

The accompanying drawings, which are incorporated in and constitute a part of this disclosure, illustrate various embodiments of the present disclosure. In the drawings.

DETAILED DESCRIPTION

Figure 1:
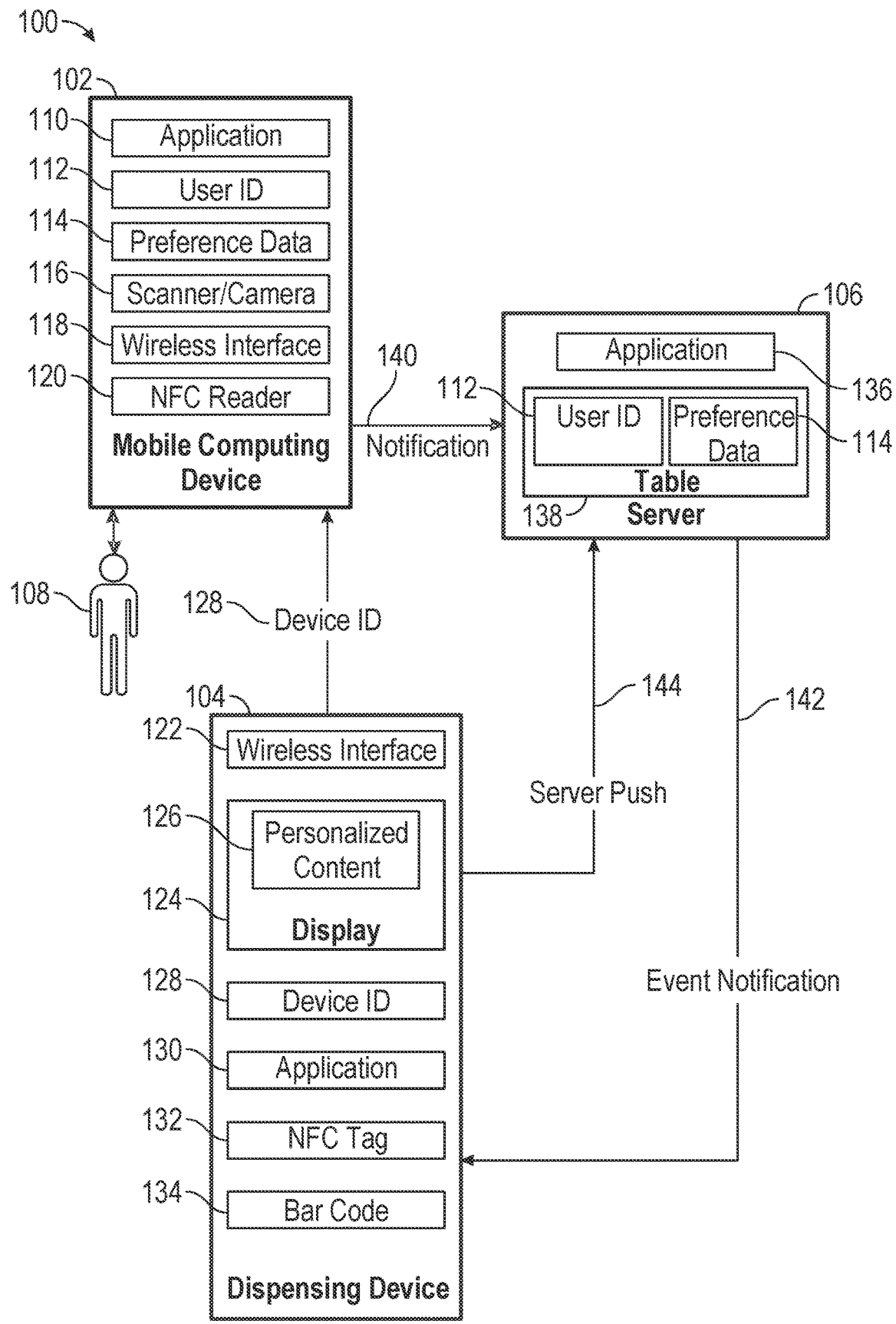
FIG. 1 shows a block diagram of a network architecture.

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Users may wish to interact with dispensing devices in customized or personalized ways. Dispensing devices may include a beverage dispenser like a fountain or post-mix beverage dispenser, vending machine, kiosk, ATM, point-of-sale device, or other unattended electronic devices with which a consumer may desire personalized interaction. While the term dispensing device is used throughout the examples provided in this specification, it is intended that all the uses of this term also refer to other public interaction terminals or unattended interaction devices with which a consumer would want to have a customized user interaction or otherwise exchange data.

A user may use a corresponding mobile computing device to establish a personalized interaction with a dispensing device. Because a number of users may establish a line or sequence of users (i.e., a queue) awaiting their turn to interact with a dispensing devices, a queuing problem may come about. The queuing problem may be further exacerbated when there are multiple dispensing devices within a confined area, such as within wireless communication range using WiFi, WiFi Direct, Bluetooth, or Bluetooth Low Energy communications. For example, there may be confusion as to which user in the queue is currently addressing the dispensing device and wishes to establish a personalized interaction with the dispensing device.

That is, multiple users may be in wireless communication range of one or more dispensing devices and it may not be readily ascertainable which user is actually addressing a particular dispensing device. While the signal strength of wireless communications signals between one or more mobile devices and a dispensing device may provide an indication of how far away from each other they are, the signal strength may vary between users in a queue based on uncontrolled variables such as whether a consumer has their mobile device in their hand, pocket, purse, or other holder. Accordingly, it is desirable to implement device authentication in which a mobile computing device and a dispensing device may be paired to interact in a customized or personalized way.

Consistent with embodiments of the disclosure, device authentication may be provided. For example, a mobile computing device may read a device identification (ID) of a dispensing device (e.g., a beverage dispenser, kiosk, ATM, vending machine, or other unattended electronic device with which consumers may desire personalized interaction, etc.) wirelessly when the mobile computing device is placed in close proximity to the dispensing device. For example, close proximity may be within wireless communication range between the mobile device and the dispensing device. The device ID may be an ID that uniquely identifies the dispensing device. The device ID may be broadcast from the dispensing device. For example, the device ID may be transmitted periodically from the dispensing device like a beacon pinging out the device identification. In some embodiments, a BLUETOOTH or BLUETOOTH LOW ENERGY (BLE) beacon or other beacon device may broadcast the device ID. The device ID may be transmitted in a signal with such low energy that the signal may only be readable by a mobile computing device in close proximity to the dispensing device, for example within 1 to 12 inches of the dispensing device and preferably within 4 inches. In other words, the device ID may only be readable by the mobile computing device when the mobile computing device is placed in close proximity (e.g., approximately 4 inches or otherwise within 1 to 12 inches) to the dispensing device.

That is, the signal with the device ID may be transmitted no greater than about 1 to 12 inches, preferably no greater than 4 inches, from the dispensing device. As such, the mobile computing device is most probably associated with a consumer who is currently addressing the dispensing device as opposed to a consumer further back in the queue waiting to address the dispensing device or in a queue for an adjacent dispensing device. In other words, the beacon may purposefully be configured to limit the transmission range of the signal with the device ID to limit the possibility of multiple mobile computing devices in the queue from receiving the signal. For example, a Bluetooth beacon with a typical transmission range of 10 meters or more may be purposefully limited to only transmit a signal within 1 to 12 inches.

In some embodiments, a BLE beacon on the dispensing device is configured to broadcast a unique device ID of the dispensing device. The BLE beacon may be configured to limit the range of the broadcast of the device ID to the extent that a user would need to place their mobile device adjacent (such as within 1 to 12 inches, preferably 4 inches) to the BLE beacon on the dispensing device. Therefore, while BLE beacons are generally able to enable wireless communication with mobile devices within around 10 m, the BLE beacon of the pending disclosure may be configured to purposefully limit the range so as to emulate a user experience similar to an NFC communication exchange.

In some embodiments, the range of the BLE beacon may be extended to within 12 to 48 inches of the dispensing device such that a user may keep their mobile device in their pocket, purse, or other holder and still be able to receive the signal with the unique device ID of the dispensing device. That is, the range of the wireless signal with the device ID may be transmitted no more than about 12 to 48 inches from the dispensing device. In such embodiments, the range may be set so that a mobile device of a user addressing the dispensing device is the most probable device to receive the signal with the unique ID of the dispensing device, as opposed to a mobile device of a user further back in the queue or a mobile device of a user at an adjacent dispensing device. In some embodiments, shielding in the dispensing device or beamforming of the signal with the unique ID of the dispensing device may further limit a mobile device of a user at an adjacent dispensing device from receiving the signal.

The mobile computing device may have an application installed that corresponds to the dispensing device. For example, the mobile computing device may have a beverage dispenser application installed that corresponds to a particular brand or model of beverage dispenser, such as the Coca-Cola Freestyle mobile application for facilitating communication with Coca-Cola Freestyle beverage dispensers from THE COCA-COLA COMPANY of Atlanta, Ga. Under the control of the application on the mobile computing device, the mobile computing device may extract the device ID from the aforementioned low energy signal. Then the application on the mobile computing device may validate the device ID as being a valid device ID and authenticate the paring of the mobile computing device and the dispensing device to facilitate further personalized interaction with the dispensing device.

For example, a mobile device with a beverage dispenser mobile application installed may receive a signal with a unique device ID from a beverage dispenser. The beverage dispenser mobile application may examine the unique device ID to verify that the beverage dispenser is a valid beverage dispenser with which the beverage dispenser mobile application may communicate.

In some embodiments, the mobile application on the mobile computing device may determine that the unique device ID is from a valid dispensing device with which it may communicate based on examining the device ID as a whole or a portion thereof. The device ID of valid dispensing devices may have a common prefix, suffix, or other portion of the device ID that is common to all valid dispensing devices. For example, all beverage dispensers that are valid for personalized interactions with a user may have a common prefix in their device ID that identifies them as valid beverage dispenser. Upon a mobile device with a corresponding beverage dispenser application receiving the device ID, the beverage dispenser mobile application may determine that the device ID is valid based on the prefix in the device ID. The device ID may also include a unique identifier for the dispensing device. For example, a beverage dispenser device ID may include a prefix as described above as well as an identifier that is unique to that particular beverage dispenser.

Because the mobile computing device receives the signal with the device ID, it is determined that a user of the mobile device is currently addressing the dispensing device that broadcast the device ID. Additionally, because the application installed on the mobile device that corresponds to the dispensing device determines that the device ID is a valid device ID, the dispensing device and the mobile computing device may be authenticated for additional personalized interactions with each other. Accordingly, the mobile computing device and the dispensing device may be paired or a personalized interaction may be facilitated on the dispensing device as described in more detail below.

After the mobile computing device and the dispensing device are paired or the dispensing device otherwise engaged in a personalized interaction, no other mobile computing device may pair with or otherwise communicate with the dispensing device until the pairing is released. In some embodiments, the dispensing device may discontinue broadcasting the device ID while paired with the mobile device or otherwise engaged in a personalized interaction.

Once the mobile computing device and dispensing device are authenticated for interaction with each other, and in some embodiments are paired and ready for further interaction, the mobile computing device may send the device ID, or a portion thereof, along with a user ID to a server in a notification from the mobile computing device. The notification may be sent to the server from the mobile computing device over a network (e.g. the Internet, a cellular network, combinations thereof, etc.), via the mobile computing device's data plan for example. The device ID or portion thereof received by the server from the mobile computing device may uniquely identify the dispensing device. For example, when a prefix, suffix, or other portion of the device ID is common to multiple dispensing devices, such common portions of the device ID may not be communicated to the server. In other words, only portions of the device ID that uniquely identify the dispensing device may be communicated to the server.

Using the user ID, the server may look up user preferences or a user profile corresponding to a user of the mobile device from a table on the server. The server may send over a network (e.g., the Internet) the user preferences, the user profile, or portions thereof to the dispensing device that corresponds to the device ID or portion thereof. In response, the dispensing device may display a customized user interface or otherwise facilitate a personalized interaction with the user based upon the user preferences sent by the server.

Consistent with embodiments of the disclosure, rather than a personalized interaction being facilitated via the aforementioned server, the mobile computing device and the dispensing device may connect directly via a wireless connection (e.g., WiFi). In this case, rather than looking the user preferences up on the server, the user preferences may be sent directly from the mobile computing device to the dispensing device over the wireless connection. To facilitate the wireless connection, the dispensing device may include a wireless access point. Furthermore, in addition to the device ID, the aforementioned low energy signal may also include a service set identification (SSID) and a password for the access point included with dispensing device.

Alternatively, the application on the mobile computing device may already have the SSID and password for connecting to the access point on the dispensing device. For example, all dispensing devices associated with the application may have the same SSID and password. The common SSID and password for dispensing device access points may be stored in a database accessible to the application, either on the mobile device itself, such as in a directory associated with the application on the mobile device, or in a remote database accessed by the mobile device via a network connection, such as a cellular network, the Internet, etc.

Under the control of the application on the mobile computing device, mobile computing device may extract from the aforementioned low energy signal or otherwise obtain the SSID and the password. In such an example, the dispensing devices may use common pre-loaded credentials (i.e., the same SSID and password or a limited set thereof) so that the mobile computing device can connect to the dispensing devices using the credentials stored in the application.

The application can be programmed to identify or otherwise detect when a dispensing device is within proximity of the mobile electronic device and automatically establish a communication path therebetween using the credentials. In the event multiple dispensing devices are located in close proximity, each of the dispensing devices can user one of a limited set of credentials. The application can be programmed to determine which of the dispensing devices has the most robust connection characteristics (e.g., highest signal strength) and automatically establish a connection therebetween. To accomplish this connection, the application can be programmed to select among the limited set of credentials and/or cycle through the limited set of credentials until a communication path is established with the selected beverage dispenser. Other configurations are possible.

Alternatively, upon the mobile computing device being authenticated for further interaction with the dispensing device, the mobile application may provide the SSID and password. Using the SSID and the password, the mobile computing device may connect directly via a wireless connection established with the dispensing device. The mobile computing device may send, over the established wireless connection, the user preferences to the dispensing device. In response, the dispensing device may display a customized user interface based upon the user preferences sent by mobile computing device.

Other data may be communicated between the mobile device and the dispensing device, such as order data (e.g., order identifier information, one or more product selections associated with a particular order, etc.), payment data (e.g., credit card information, payment token information, etc.), display data (e.g., data that is provided from the mobile device to be displayed on the dispenser such as picture data, customized display settings, etc.), selection data (e.g., selections of one or more products to be dispensed, etc.), and commands (e.g., using the mobile device as a remote to provide commands directly to the dispensing device for controlling the operation of the dispensing device).

Further, other communication paths could be used to communicate preference or profile data to the dispensing device, such as via an electronic mail address associated with the dispensing device (similar to how some networked printers work).

In other embodiments consistent with embodiments of the disclosure, another wireless connection may be established in addition to the wireless connection between the mobile computing device and the dispensing device. This other wireless connection may have greater bandwidth than the wireless connection between the mobile computing device and the dispensing device. For example, rather than or in addition to connecting to an access point in the dispensing device, the mobile computing device may connect to a second access point provided, for example, by a retail outlet in which the dispensing device is disposed.

For example, the dispensing device may be within transmission range of the second access point. Upon configuring the dispensing device to operate in the retail outlet, the dispensing device may be provided with the SSID and password for the second access point. The mobile computing device may obtain, from the dispensing device or elsewhere, a SSID and a password for the second access point provided by the retail outlet. In some embodiments, the mobile communication device may establish a communication session with the dispensing device via the first access point as described above. The dispensing device may then pass the SSID and password or other credentials for accessing the second access point to the application on the mobile device. The communication session between the dispensing device and the mobile device may then be closed The mobile computing device may then use the credentials provided by the dispensing device to establish another wireless connection; this time with the second access point provided, for example, by the retail outlet in which the dispensing device is disposed.

FIG. 1 shows a network architecture 100 for facilitating an individualized interaction between a mobile computing device and an electronic device. As shown in FIG. 1, network architecture 100 may include a mobile computing device 102, a dispensing device 104, and a server 106. Mobile computing device 102 may be utilized by a user 108 and may be in communication with dispensing device 104 and server 106. The aforementioned network architecture for facilitating an individualized interaction between a mobile computing device and an electronic device may be described in related patent application U.S. Ser. No. 61/860,634 entitled "Facilitating Individualized User Interaction with an Electronic Device," filed on Jul. 31, 2013, the disclosure of which is incorporated herein, in its entirety, by reference.

Computing device 102 may include a computing device application 110, a user ID 112, preference data 114, a scanner/camera 116, a mobile computing device wireless interface 118, and a near field communication (NFC) reader 120. Computing device 102 may comprise, but is not limited to, a smartphone, a tablet computer, or a laptop computer that may be capable of executing one or more software application programs, such as application 110. Computing device 102 may be practiced in a computing environment 900 described below with respect to FIG. 9.

Figure 10:
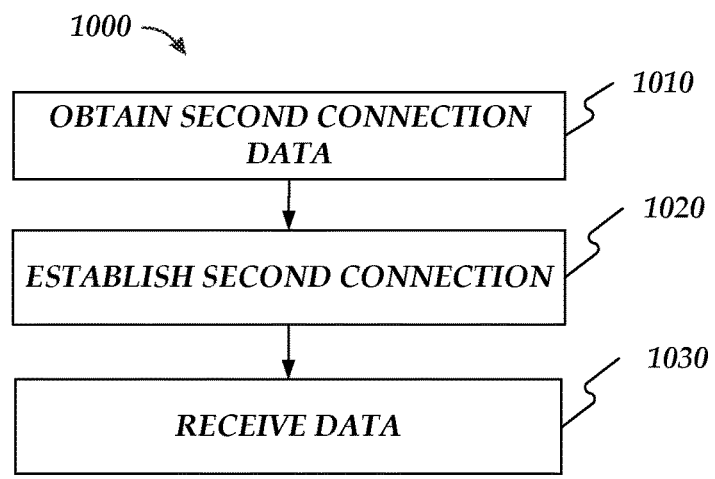
FIG. 10 is a flow diagram illustrating a two-way wireless connection.

Dispensing device 104 may comprise a dispensing device wireless interface 122 and a display 124 that may provide personalized content 126. Dispensing device 104 may further comprise a device ID 128, a dispensing device application 130, an NFC tag 132, and a bar code 134. Bar code 134 may comprise any machine-readable object (e.g., one-dimensional (1-D) or two-dimensional (2-D)) that may provide data relating to dispensing device 104. Bar code 134 may be displayed on display 124. Dispensing device 104 may be practiced in an operating environment such as an electronic device 1000 as described with respect to FIG. 10.

Server 106 may comprise a server application 136 and a table or database 138. Table 138 may store preference data 114 related to user ID 112. Server 106 may be practiced in an operating environment such as electronic device 1000 as described with respect to FIG. 10.

Scanner/camera 116 and may be capable of short range wireless communication via wireless interface 118. Wireless interface 118 may be configured to provide short range wireless communications (e.g., 1-12 inches, more preferably less than 4 inches) via, but not limited to, NFC, BLUETOOTH wireless technology, BLUETOOH LOW ENERGY (BLE) wireless technology, and Wi-Fi. Preference data 114 may also be stored on server 106 or in a database accessible via server 106 and cross-referenced (e.g., via table 138) with user ID 112. User ID 112 may comprise an ID for user 108 of mobile computing device 102. Preference data 114 may comprise preferences associated with user 108. For example, preference data 114 may comprise a list of user 108's favorite beverages, games, products, and/or restaurants, a list of user 108's custom beverage mixes, and/or other information that can be used to personalize user 108's interaction with dispensing device 104.

Application 110 may be configured to send user ID 112 and preference data 114 along with device ID 128 (e.g., retrieved from dispensing device 104) in a notification 140 to server 106 for conducting an individualized or unique interaction with dispensing device 104. Notification 140 may only include user ID 112 and device ID 128. Upon receipt of device ID 128 and user ID 112, server 106 may obtain and communicate preference data 114 (e.g., or a subset thereof) to dispensing device 104.

Upon receiving device ID 128, server 106 may determine that mobile computing device 102 (and hence user 108 of mobile computing device 102) may be proximate to dispensing device 104. Depending on how device ID 128 is obtained (e.g., scanning a barcode from dispensing device 104, reading an NFC tag associated with dispensing device 104, or receiving a BLUETOOH LOW ENERGY (BLE) wireless technology signal associated with dispensing device 104), server 106 may further determine that user 108 is addressing or is otherwise ready to commence interaction with dispensing device 104. This may be opposed to user 108 being in line to use dispensing device 104, but not yet being ready to commence interaction with dispensing device 104.

Device ID 128 may be retrieved without establishing a communication session between mobile computing device 102 and dispensing device 104. For example, device ID 128 may be retrieved by using scanner/camera 116 in conjunction with application 110 to scan a barcode (e.g., a 1-D or 2-D barcode) or other symbol encoded with device ID 128 on dispensing device 104 (or displayed on display 124). In other words, the barcode or other symbol may be rendered on display 124 of dispensing device 104, or printed, embossed, shown on a sticker, or otherwise made visible on one or more surfaces of dispensing device 104.

Device ID 128 may be retrieved by NFC reader 120 reading device ID 128 from NFC tag 132. NFC tag 132 may be a passive or an active NFC tag that may store device ID 128. NFC tag 30 may comprise an RFID tag where the ID associated with the RFID tag may comprise device ID 128. NFC tag 132 may be placed inside a cabinet containing dispensing device 104 at a location such that NFC reader 120 on mobile computing device 102 may still read NFC tag 132. By placing NFC tag 132 inside the cabinet, NFC tag 132 may be protected from tampering.

Device ID 128 may be retrieved by initiating a communication session between mobile computing device 102 and dispensing device 104. For example, mobile computing device 102 may communicate via a wireless communication session (e.g., between mobile computing device wireless interface 118 and dispensing device wireless interface 122) with dispensing device 104 using BLUETOOTH wireless technology, BLUETOOH LOW ENERGY (BLE) wireless technology, Wi-Fi or other wireless communication standards or technologies.

Consistent with embodiments, preference data 114 may be communicated directly from mobile computing device 102 to dispensing device 104 via a communications session between mobile computing device wireless interface 118 and dispensing device wireless interface 122. For example, application 110 may pass preference data 114 to application 130 upon establishment of a communications session. Dispensing device 104 may comprise a computing device capable of executing one or more software application programs such as application 130. Dispensing device 104 may also be configured to provide any number of consumer services and/or products, including, without limitation, the dispensing of food and/or beverage products, video gaming services, video services, advertisement services, financial services, etc. Dispensing device 104 may include fountain or post-mix beverage dispensing machines, vending machines, public gaming devices, automated teller machines or any other electronic device or kiosk configured to provide consumer products and/or services.

Similar to wireless interface 118 in mobile computing device 102, wireless interface 122 in dispensing device 104 may be configured to provide short range wireless communications via NFC, BLUETOOTH wireless technology, BLUETOOH LOW ENERGY (BLE) wireless technology, Wi-Fi or other wireless technologies. Dispensing device 104 may be utilized to display personalized content 126 to user 108 based on preference data 114. For example, personalized content 126 may include a selection of user 108's favorite beverages that may be available for purchase, advertisements targeted towards user 108's favorite products, etc.

Device ID 128 may comprise a unique identification of dispensing device 104. Device ID 128 may be utilized for identifying dispensing device 104 among other similar devices in a network. Application 130 may be configured to send device ID 128 to mobile computing device 102 in response to a communication session initiated by user 108. As discussed above, the communication session may comprise a short range wireless communication session during which device ID 128 may be sent to mobile computing device 102. For example, device ID 128 may be encoded in an unpowered NFC tag 132 that may be affixed to dispensing device 104. Device ID 128 may be communicated when user 108 touches or brings mobile computing device 102 in close proximity with NFC tag 132 or when a BLUETOOH LOW ENERGY (BLE) wireless technology signal is read from dispensing device 104.

Device ID 128 may comprise stored data on dispensing device 104 and may be communicated in response to a data request made by user 108 during a Wi-Fi, or BLUETOOTH wireless technology session, or a BLUETOOH LOW ENERGY (BLE) wireless technology session with mobile computing device 102. In addition, the communication session may comprise a scanning session initiated by user 108. For example, device ID 128 may be encoded in a 1-D or 2-D barcode (e.g., a QR code) or other symbol that may be either physically affixed to dispensing device 104 or displayed by dispensing device 104 on display 124.

Application 130, executing on dispensing device 104, may be configured to receive an event notification 142 from server 106. Event notification 142 may include, for example, user ID 112 and preference data 114. Event notification 142 may be sent after user ID 112, device ID 128, and preference data 114 are received by server 106. Communication between application 130 on dispensing device 104 and application 136 on server 106 may be configured to utilize a server push technique in which a communication session (i.e., a server push 144) may be initiated and established by dispensing device 104 prior to user 108's interaction with dispensing device 104. Server push technology may include, but is not limited to, long polling, Comet, web sockets or Berkeley socket ("BSD") techniques. Server 106 may hold the sending of a response to data requests from dispensing device 104 until the requested data is available or a predetermined timeout event has occurred. Upon user ID 112 and preference data 114 being received by dispensing device 104, application 130 may be configured to display personalized content 126 for user 108 on display 124.

Server 106, which may be in communication with mobile computing device 102 and dispensing device 104, may comprise a computing device capable of executing one or more software application programs such as application 136. Communication between server 106, mobile computing device 102, and dispensing device 104 may take place via respective device network connections (not shown) over a wide area network, such as the Internet. Server 106 may comprise a non-blocking socket input/output server platform that may utilize a server push technology (e.g., long polling or web sockets) where dispensing device 104 may initiate a network connection (e.g., server push 144) with server 106 and keeps it open.

An example of a non-blocking socket input/output server platform may comprise the ELASTIC COMPUTE CLOUD ("EC2") web service (that may comprise an "infrastructure as a service" cloud computing platform) provided by AMAZON.COM, INC. of Seattle, Wash. The EC2 web service may further be utilized with Tornado that may comprise an open source scalable, non-blocking web server and web application framework. Embodiments of the disclosure may also be practiced in conjunction with other non-blocking socket servers and/or platforms from other providers and further, is not limited to any particular application, system, or platform.

Application 136 may be configured to receive user ID 112 and preference data 114 contained in notification 140 from mobile computing device 102 via an HTTP Application Programming Interface ("API"). Application 136 may receive user ID 112 and use table 138 to look up corresponding preference data 114. Application 136 may further be configured to server push communications to dispensing device 104. Application 136 may also be configured to delay the sending of responses to the HTTP requests from dispensing device 104 until the occurrence of one of a timeout or the receipt of notification 140.

Figure 2:
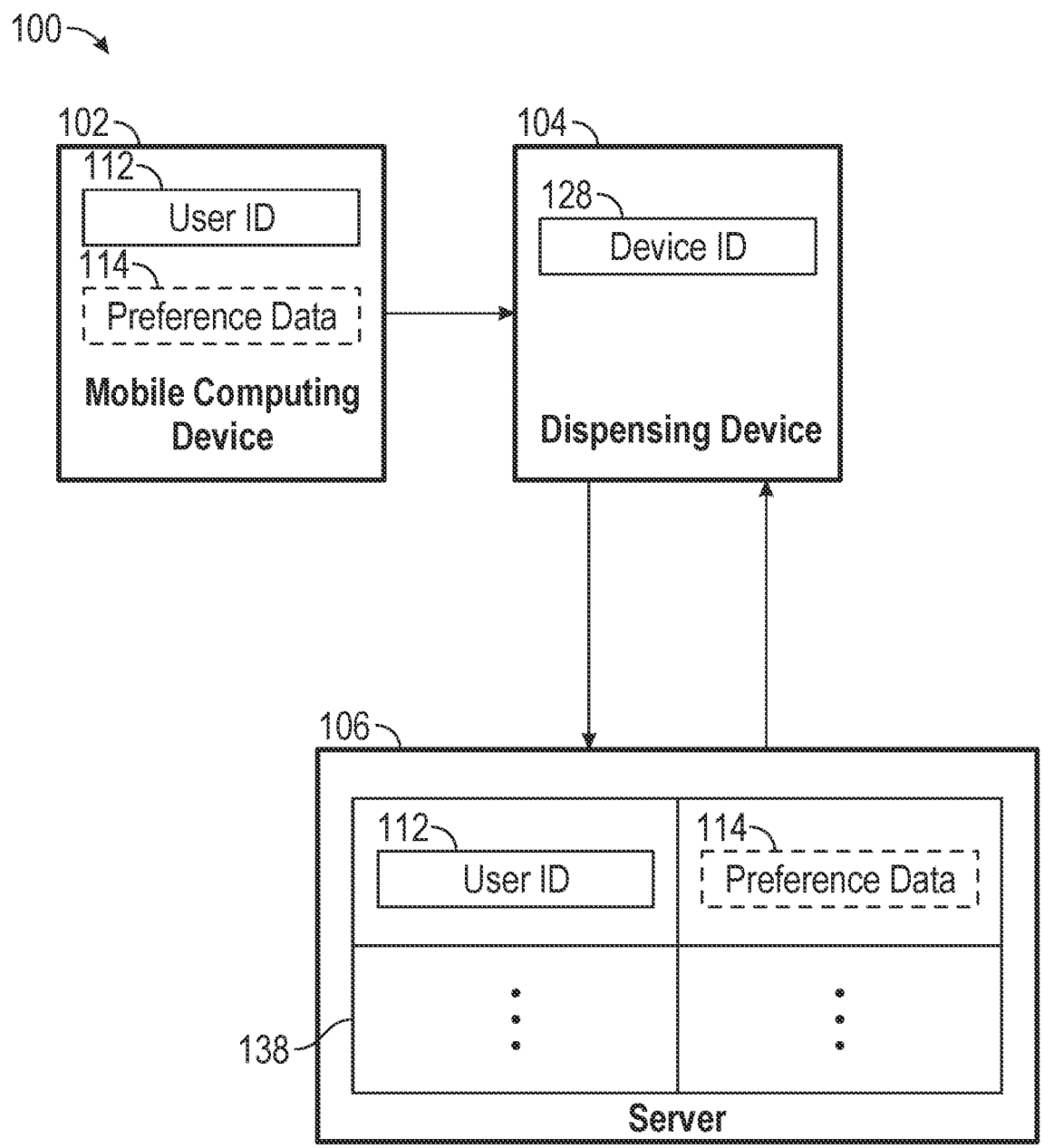
FIG. 2 shows a block diagram of a network architecture.

FIG. 2 shows network architecture 100 for facilitating an individualized interaction between mobile computing device 102 and dispensing device 104. Network architecture 100 includes mobile computing device 102 including user ID 112 and, optionally, preference data 114. Mobile computing device 102 may be in active communication with dispensing device 104 via BLUETOOTH wireless technology, BLUETOOH LOW ENERGY (BLE) wireless technology, Wi-Fi, or other wireless standards or technologies. Dispensing device 104, which may store device ID 128, may receive user ID 112 (and optionally, preference data 114) from mobile computing device 102. Dispensing device 104 may then send device ID 128 to server 106 and receive optional preference data 114 from server 106. Server 106 may store table 138 that may include one or more user IDs 112 and, optionally, one or more instances of preference data 114. As discussed above with respect to FIG. 1, preference data 114 may be cross-referenced (e.g., via table 138) with user ID 112.

Figure 3:
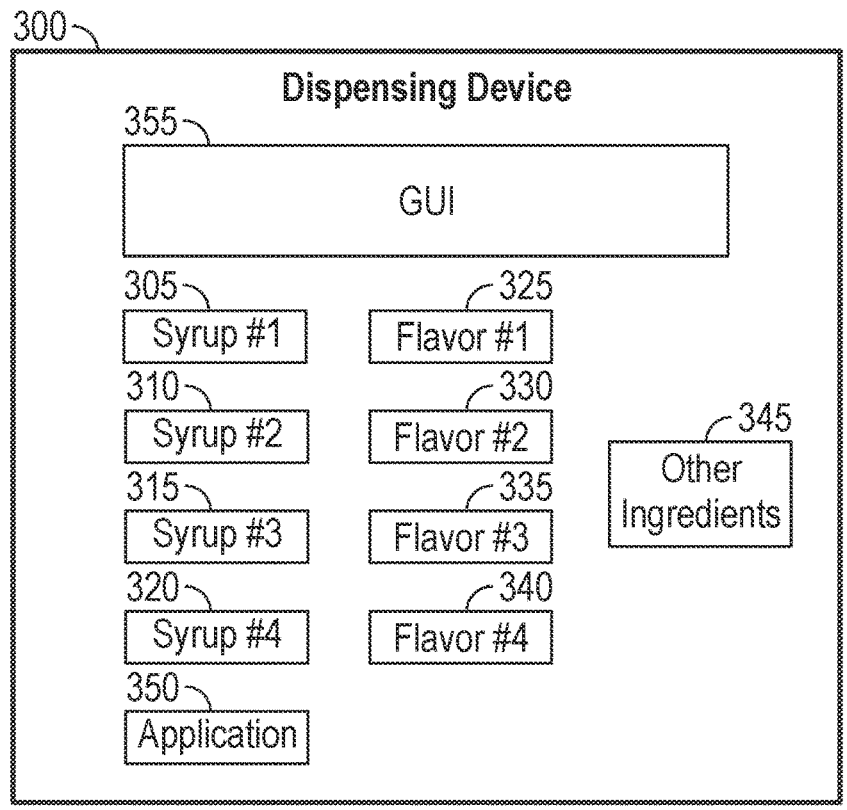
FIG. 3 shows a dispensing device.

FIG. 3 shows a dispensing device 300. Dispensing device 104 may comprise, but is not limited to, dispensing device 300. As shown in FIG. 3, dispensing device 300 may comprise various beverage bases or beverage base components such as beverage bases 305, 310, 315, and 320 as well as flavors (i.e., flavoring agents, flavor concentrates, or flavor syrups) 325, 330, 335, and 340. Dispensing device 300 may further comprise other ingredients 345, an application 350, and a graphical user interface (GUI) 355. The aforementioned dispensing device may be described in related patent application U.S. Ser. No. 61/877,549 entitled "Product Categorization User Interface for a Dispensing Device," filed on Sep. 13, 2013, the disclosure of which is incorporated herein, in its entirety, by reference.

Beverage bases 305, 310, 315, and 320 may be concentrated syrups. Beverage bases 305, 310, 315, and 320 may be replaced with or additionally provided with beverage base components. Each of beverage bases 305, 310, 315, and 320 or beverage base components and each of flavors 325, 330, 335, and 340 may be separately stored or otherwise contained in individual removable cartridges that may be stored in dispensing device 300.

Dispensing device 300 may identify the cartridges upon installation by a user or the user may be prompted to identify the cartridges when they are installed. The aforementioned beverage components (i.e., beverage bases or beverage base components and flavors) may be combined, along with other beverage ingredients 345, to dispense various beverages or blended beverages (i.e., finished beverage products) from dispensing device 300. Dispensing device 300 may also be configured to dispense beverage components individually. Dispensing device 300 may be configured to dispense beverage base components to form a beverage base. Other ingredients 345 may include diluents such as still or carbonated water, functional additives, or medicaments, for example. Other ingredients 345 may be installed in dispensing device 300, pumped to dispensing device 300, or both.

The carbonated water may be produced in dispensing device 300 through mixing of $CO_2$ and still water such as in a carbonator or other device that produces carbonated water.

Application 350 may be configured to generate GUI 355 on a display screen (not shown) of the dispensing device 300. GUI 355 may be utilized to select and individually dispense one or more beverages from dispensing device 300. The beverages may be dispensed as beverage components in a continuous pour operation where one or more selected beverage components continue to be dispensed while a pour input is actuated by a user or in a batch pour operation whereby a predetermined volume of one or more selected beverage components are dispensed (e.g., one ounce at a time).

GUI 355 on dispensing device 300 may be addressed via a number of methods to select and dispense beverages. For example, the user may interact with GUI 355 via touch input to navigate one or more menus from which to select and dispense a beverage. As another example, the user may type in a code using an onscreen or physical keyboard (not shown) on dispensing device 300 to navigate one or more menus from which to select and dispense a beverage. As yet another example, the user (e.g., user 108) may use mobile computing device 102 to scan a one or two-dimensional barcode (e.g., a QR code) or other symbol shown on a tag or sticker affixed to, printed on dispensing device 300 or displayed on a display (e.g., GUI 355) of the dispensing device 300 to select a beverage for dispensing.

Figure 4:
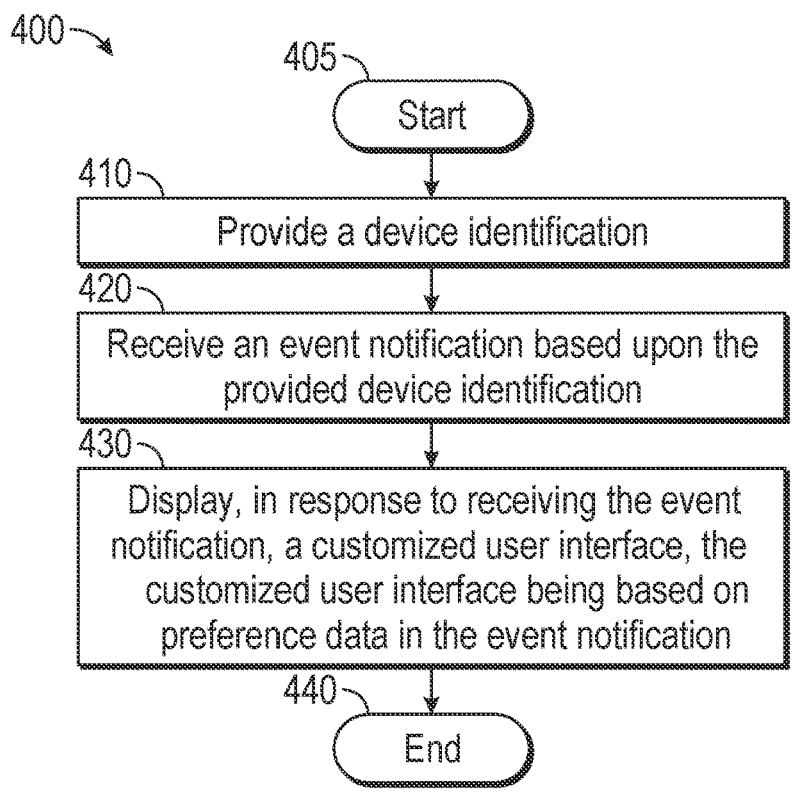
FIG. 4 is a flow chart setting forth the general stages involved in a method for providing device authentication.

FIG. 4 is a flow chart setting forth the general stages involved in a method 400 consistent with an embodiment of the disclosure for providing device authentication. Method 400 may be implemented using network architecture 100 as described above with respect to FIG. 1, FIG. 2, and FIG. 3. Ways to implement the stages of method 400 will be described in greater detail below.

Figure 5:
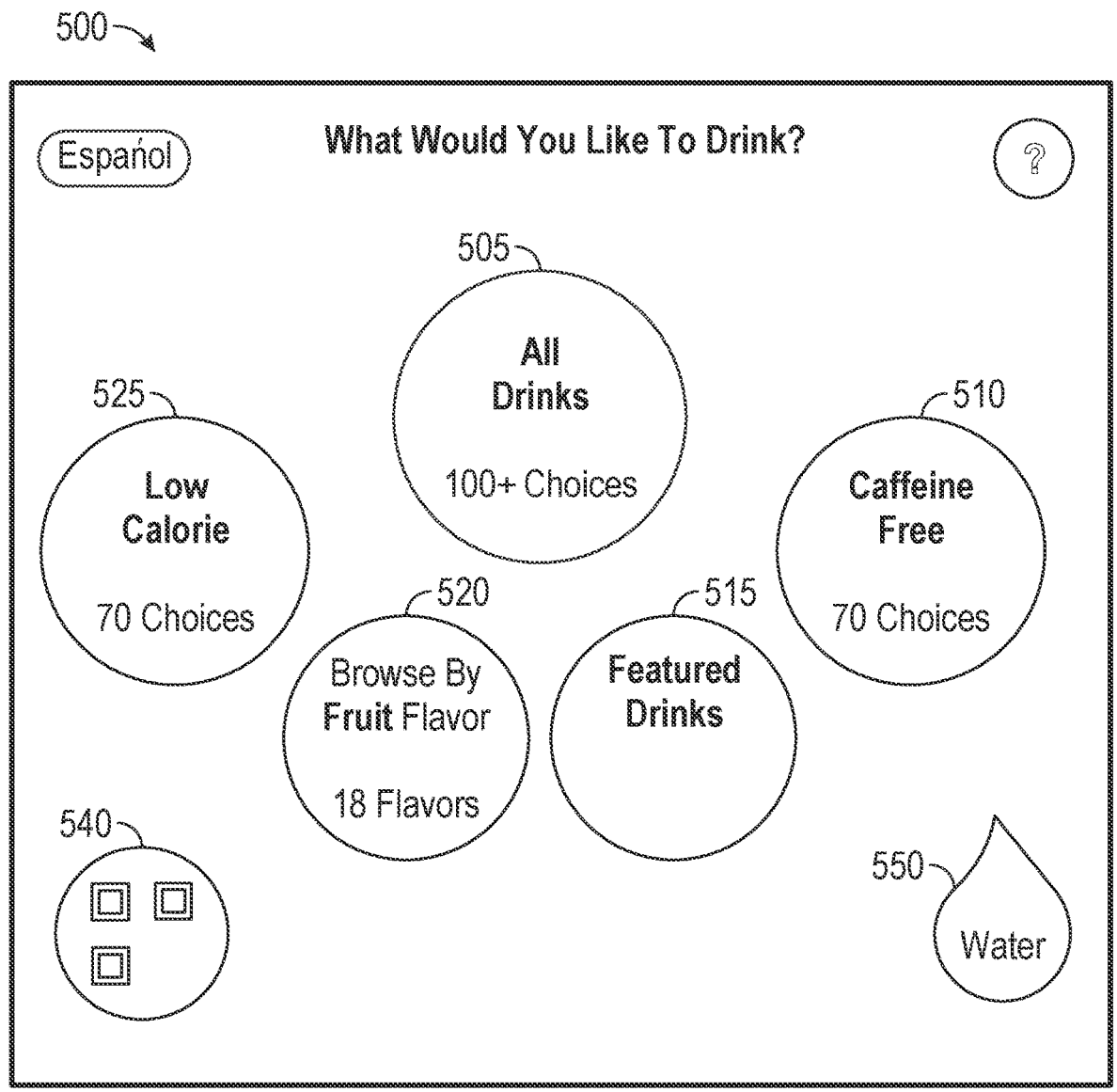
FIG. 5 shows a user interface.

Method 400 may begin at starting block 405 and proceed to stage 410 where dispensing device 104 may provide device identification 128. Application 130 may display a user interface 500 on display 124. As shown in FIG. 5, user interface 500 may be utilized for selecting a menu associated with different product categories that may be dispensed from dispensing device 104. User interface 500 may include a main menu of product categories 505, 510, 515, 520 and 525 that may be selected by user 108. Each of the aforementioned categories may correspond to various product categories such as all of a number of beverage brands available on dispensing device 104 (e.g., product category 505), a caffeine-free beverage category (e.g., product category 510), a featured category associated with beverages tied to one or more promotional or advertising campaigns (e.g., product category 515), a flavor category in which beverages are organized corresponding to a particular fruit flavor or other particular flavor additive available on dispensing device 104 (e.g., product category 520), and a low-calorie beverage category (e.g., product category 525).

User interface 500 may also include a Help user control 530 that may be selected by user 108 to review instructions for selecting and dispensing a product from dispensing device 104. User interface 500 may also include a language toggle user control 535 that may be selected by user 108 to change the language utilized. User interface 500 may also include a bar code 540 that may comprise a one or two-dimensional barcode (e.g., a QR code) or other symbol that may be utilized by user 108 to uniquely identify dispensing device 104 so as to enable a customized interaction or enable user 108 to remotely access dispensing device 104 from mobile computing device 102. The aforementioned consumer customized interactions and remote access tasks are described in related patent application U.S. Ser. No. 61/863,269 entitled "Dynamically Adjusting Ratios of Beverages in a Mixed Beverage," filed on Aug. 7, 2013, the disclosure of which is incorporated herein, in its entirety, by reference. User interface 500 may also include a user control 550 for directly accessing a product (e.g., water) from the main menu of product categories 505-525. User control 550 may be utilized by a consumer who only wishes to quickly dispense a product without having to navigate through one or more of product categories 505-525.

Consistent with embodiments of the disclosure, dispensing device 104 may transmit a wireless signal including device identification 128. The wireless signal may comprise, but is not limited to, a Bluetooth low energy (BLE) signal. The wireless signal may be utilized by mobile computing device 102 to uniquely identify dispensing device 104 so as to enable a customized interaction or enable user 108 to remotely access dispensing device 104 from mobile computing device 102. The wireless signal may comprise a low energy signal and may only be readable when a receiver (e.g., mobile computing device 102) is in close proximity. For example, the wireless signal may only be readable by mobile computing device 102 when mobile computing device 102 is placed in close proximity (e.g., approximately 4 inches or otherwise within 1 to 12 inches, or the range of the BLE beacon may be extended to within 12 to 48 inches in some embodiments) to display 124. This may eliminate the aforementioned queuing problem. The wireless signal, including device identification 128, may be transmitted periodically, for example, like a beacon pinging out device identification 128.

Figure 6:
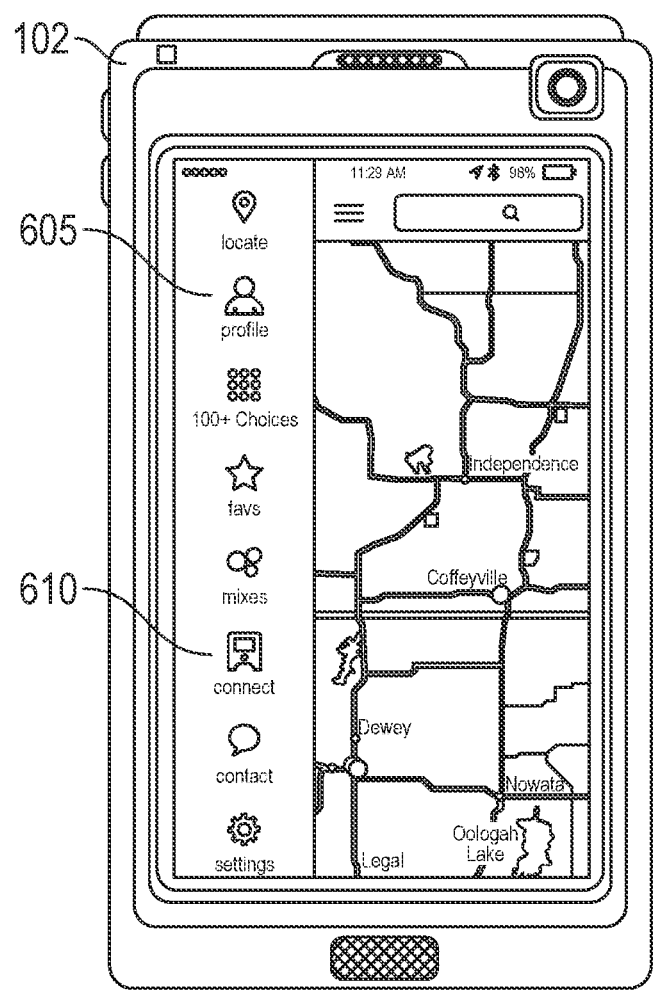
FIG. 6 shows a user interface.

From stage 410, where dispensing device 104 provides device identification 128, method 400 may advance to stage 420 where dispensing device 104 may receive an event notification (e.g., event notification 142) based upon provided device identification 128. For example, user 108 may cause application 110 to execute on mobile computing device 102. As a result, application 110 may cause a user interface 605 to be displayed on mobile computing device 102 as shown in FIG. 6. User interface 605 may include a plurality of user options including, but not limited to, a connect option 610.

From user interface 605, user 108 may select connect option 610. In response to user 108 selecting connect option 610, application 110 may cause wireless interface 118 on mobile computing device 102 to seek the wireless signal (e.g., including device ID 128) being transmitted by wireless interface 122 on dispensing device 104. Mobile computing device 102 may receive the wireless signal including device ID 128 when mobile computing device 102 is placed in close proximity to dispensing device 104. The wireless signal may comprise a low energy signal and may only be readable when a receiver (e.g., mobile computing device 102) is in close proximity to, for example, display 124.

Consistent with embodiments of the disclosure, dispensing device 104 may comprise a machine (e.g., a beverage dispensing machine) that user 108 wishes to have customized interaction with. Accordingly, user 108 may place mobile computing device 102 within a few inches of display 124. As a result, mobile computing device 102 may receive the wireless signal including device ID 128. Device ID 128 may uniquely identify dispensing device 104 or may just indicate a particular device type that dispensing device 104 comprises.

If device ID 128 just indicates a particular device type that dispensing device 104 comprises, location data (e.g., Global Position System (GPS) coordinates) of dispensing device 104 may also be used to uniquely identify dispensing device 104. The location data may be created by mobile computing device 102 when it is near dispensing device 104 or may be received by mobile computing device 102 from dispensing device 104. However, when dispensing device 104 is within a bank of similar devices (e.g., beverage dispensers), device ID 128 uniquely identify dispensing device 104 (rather than just it's type) may be used because the aforementioned location data (e.g., GPS coordinates) may not be granular enough to distinguish the devices within the bank.

Once the wireless signal is received, application 110 may process the wireless signal to extract device ID 128 from the wireless signal. As described above with respect to FIG. 1, in response, mobile computing device 102 may send notification 140 to server 106 that may in turn send event notification 142 to dispensing device 104. As stated above, event notification 142 may include user ID 112 and preference data 114.

Figure 7:
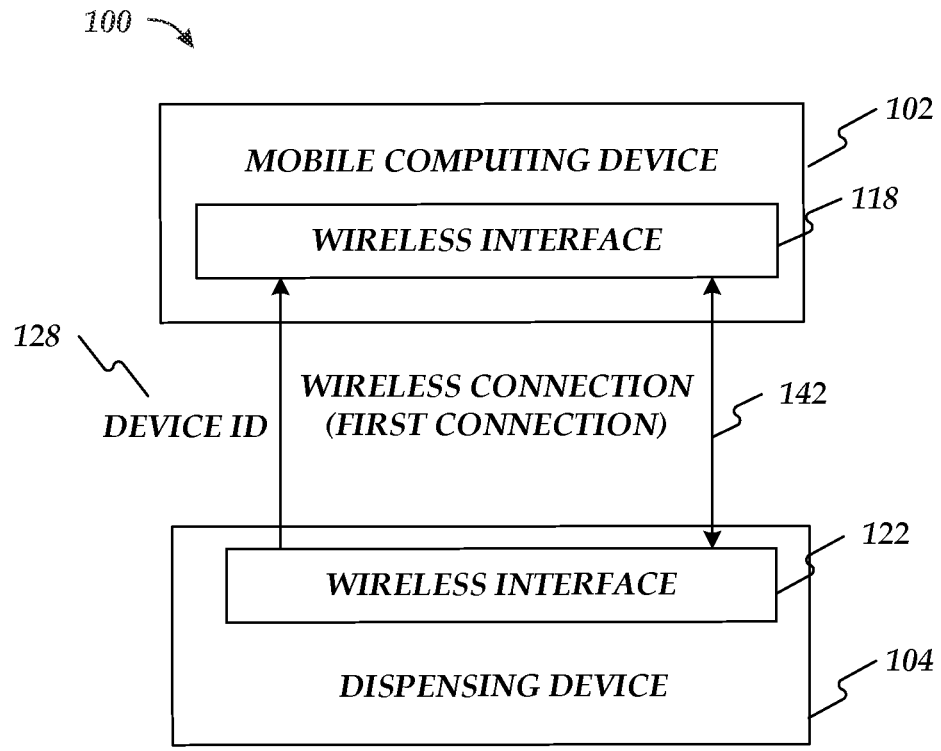
FIG. 7 shows a block diagram of a network architecture.
Figure 8:
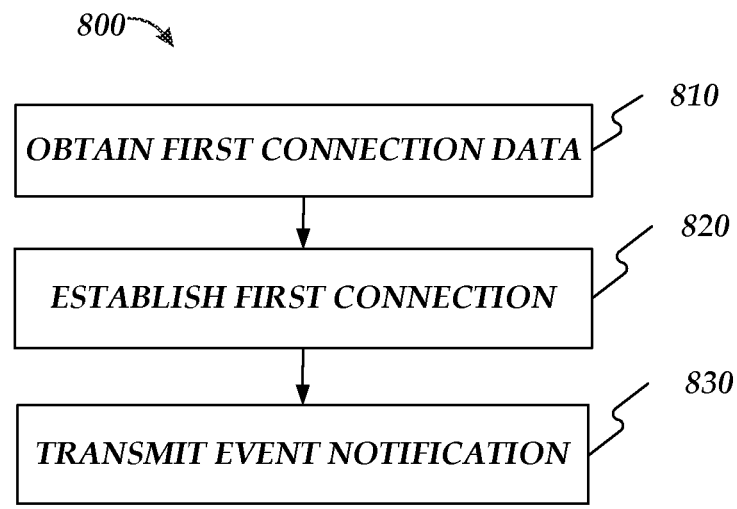
FIG. 8 is a flow diagram illustrating a two-way wireless connection.

As shown in FIG. 7, rather than going through server 106, mobile computing device 102 may provide event notification 142 directly to dispensing device 104. This may be accomplished over a two-way wireless connection (e.g., Wi-Fi) established between mobile computing device 102 and dispensing device 104 as illustrated by flow diagram 800 of FIG. 8.

Mobile computing device 102 may obtain, for example, first connection data for connecting to dispensing device 104 from the low energy signal that provide received device ID 128. (Stage 810.) For example, the first connection data may be embedded in the received device ID 128 and may comprise a service set identification (SSID) and a password for an access point associated with dispensing device 104 (e.g., wireless interface 122). As described above, the device identification may be obtained by mobile computing device 102 when mobile computing device 102 is placed in close proximity (e.g., approximately 4 inches or otherwise within 1 to 12 inches) to display 124 of dispensing device 104.

Using the first connection data, mobile computing device 102 may create (i.e., establish) the first connection with dispensing device 104 directly as shown in FIG. 7 without going through server 106 as shown in FIG. 1. (Stage 820.) Once the first connection is established, mobile computing device 102 may transmit over the established first connection, event notification 142 to dispensing device 104. (Stage 830.) Mobile computing device 102 may create event notification 142 comprising, for example, preference data 114 stored on mobile computing device 102. In this way, event notification 142 may be provided directly to dispensing device 104 from mobile computing device 102 rather than going through server 106. The event notification 142 may be provided directly over the two-way wireless connection (e.g., the first connection) established between mobile computing device 102 and dispensing device 104.

Furthermore, an enterprise controlling dispensing device 104 may wish to provide a data file (e.g., promotional data) to mobile computing device 102 in response to user 108's customized interaction with dispensing device 104. For example, dispensing device 104 may comprise a beverage dispenser and user 108 may have interacted with a customized user interface 1100 (as described below) to cause dispensing device 104 to dispense a beverage. As a result, the enterprise controlling dispensing device 104 may wish to provide mobile computing device 102 with promotional data correspond to an advertisement (e.g., a video) relevant to the dispensed beverage. However, the first connection described above with respect to FIG. 7 and FIG. 8 may not have enough bandwidth for the promotional data and dispensing device 104 may not have capacity for the promotional data.

Figure 9:
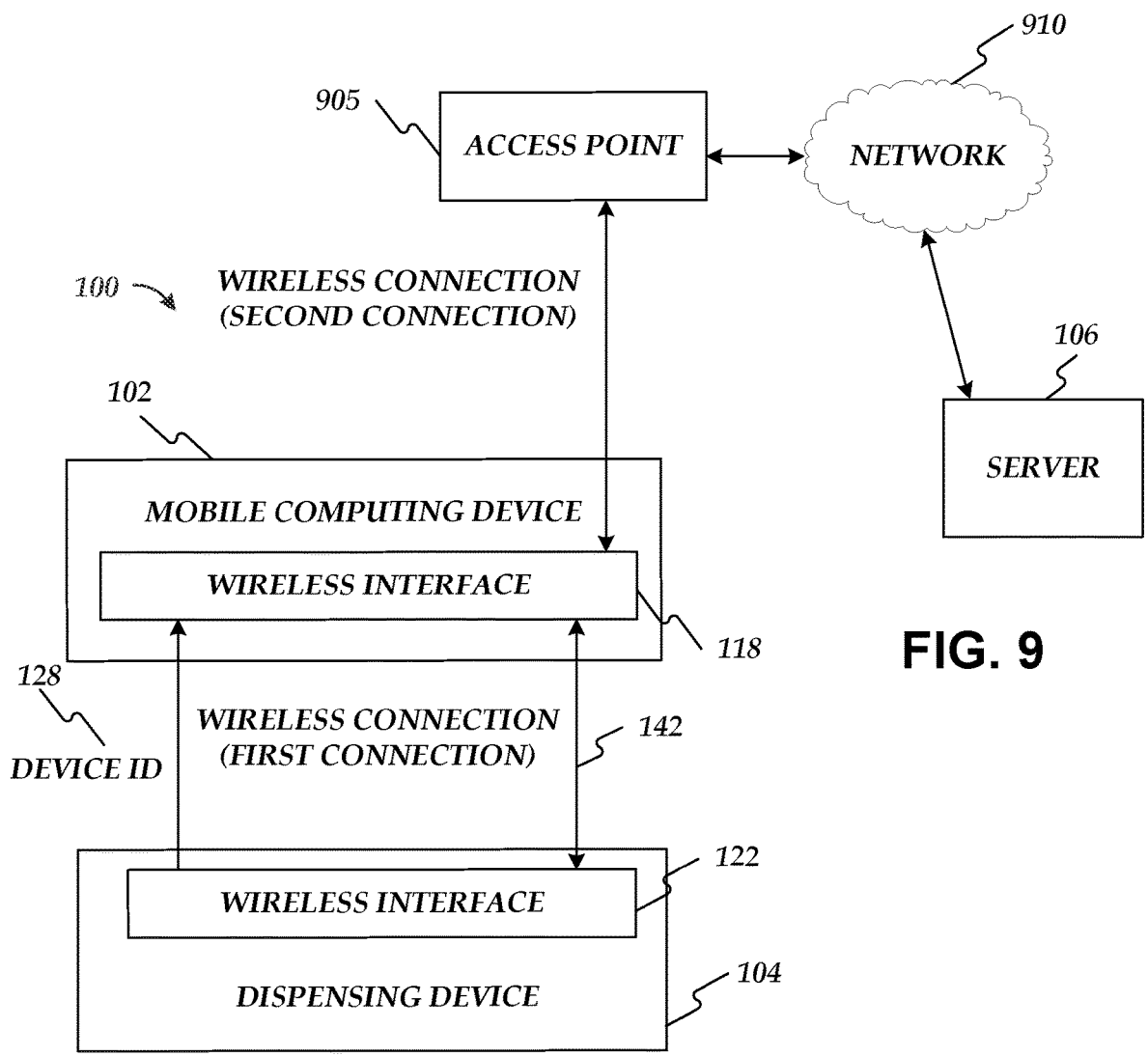
FIG. 9 shows a block diagram of a network architecture.

As shown in FIG. 9, consistent with embodiments of the disclosure, a second connection may be established that may have greater bandwidth than the first connection. For example, rather than (or in addition to) connecting to an access point in dispensing device 104 to obtain the aforementioned promotional data, mobile computing device 102 may connect to an access point 905 as illustrated by flow diagram 1000 of FIG. 10. Access point 905 may be provided, for example, by a retail outlet in which dispensing device 104 is disposed.

Mobile computing device 102 may obtain, from dispensing device 104, second connection data (stage 1010) for connecting to access point 905 provided by the retail outlet and use access point 905 to communicate with server 106 over a network 910 (e.g., the Internet). The second connection data may comprise an SSID and a password for access point 905 provided by the retail outlet. For example, the second connection data may be embedded in received device ID 128. As described above, the device identification may be obtained by mobile computing device 102 when mobile computing device 102 is placed in close proximity (e.g., approximately 4 inches or otherwise within 1 to 12 inches) to display 124 of dispensing device 104. Alternatively, the second connection data may be obtained by mobile computing device 102 from dispensing device 104 over the first connection after authenticating the mobile computing device 102 for further interaction with the dispensing device 104. Mobile computing device 102 may receive the second connection data from other sources and is not limited to receiving the second connection data from dispensing device 104.

Mobile computing device 102 may then establish the second connection with access point 905 using the obtained second connection data. (Stage 1020.) By connecting to access point 905 provided by the retail outlet, mobile computing device 102 may use access point 905 to get to server 106 over network 910 through the establish the second connection. Mobile computing device 102 may then receive the promotional data from server 106 over the established second connection (stage 1030.) Mobile computing device 102 may receive the promotional data from other sources over the second connection and is not limited to receiving the promotional data from server 106.

Figure 11:
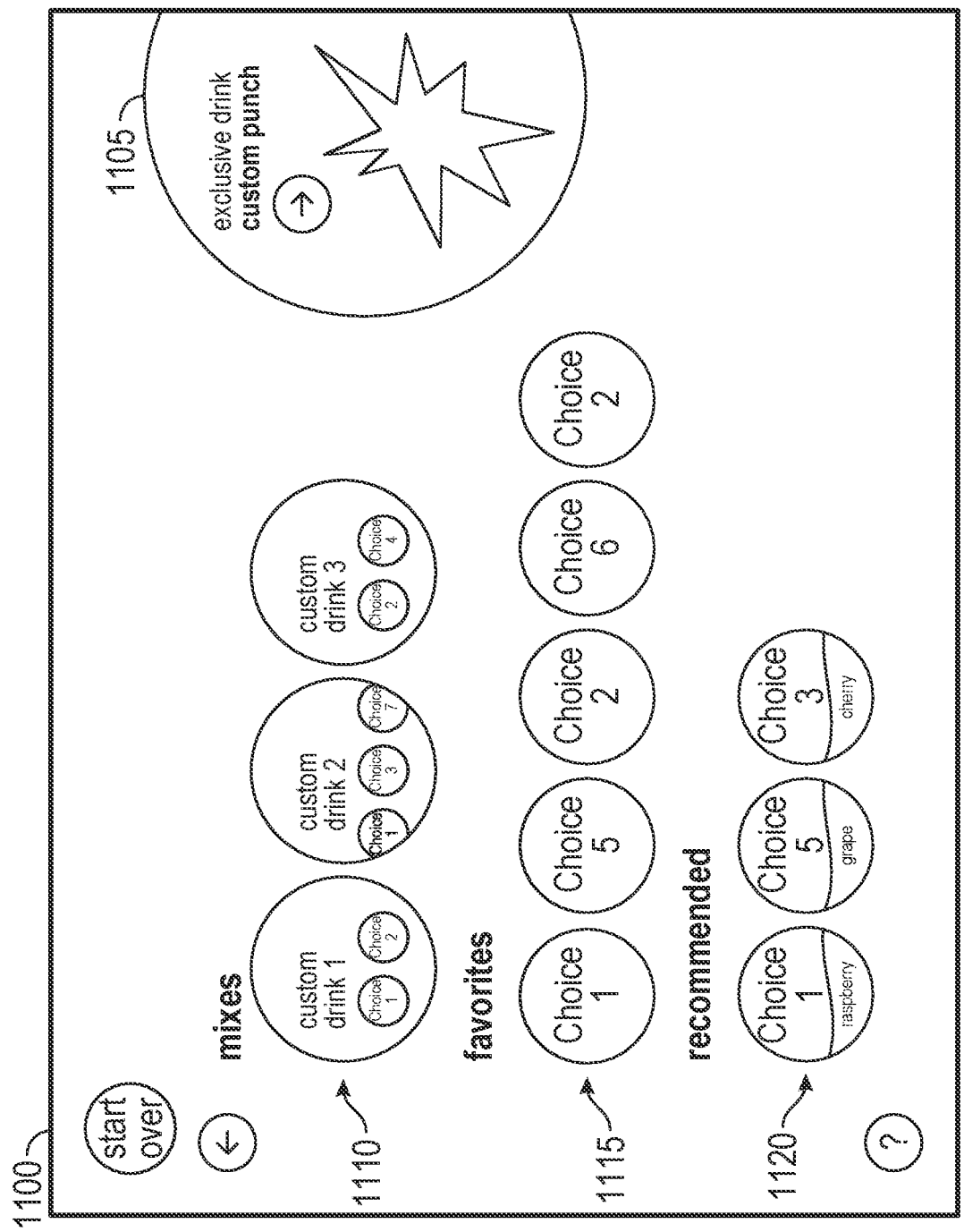
FIG. 11 shows a customized user interface.

Once dispensing device 104 receives event notification 142 based upon provided device identification 128 in stage 420, method 400 may continue to stage 430 where dispensing device 104 may display, in response to receiving event notification 142, customized user interface 1100 on display 124 as shown in FIG. 11. Customized user interface 1100 may comprise a limited time offer (LTO) section 1105. Limited time offer section 1105 may be based on received event notification 142. Consistent with embodiments of the disclosure, limited time offer section 1105 may only be displayed within customized user interface 1100 when individualized interaction between mobile computing device 102 and dispensing device 104 has been established as described above with respect to FIG. 1.

In addition to limited time offer section 1105, customized user interface 1100 may comprise a custom mixes section 1110, a favorites section 1115, and a recommended section 1120. Each of limited time offer section 1105, custom mixes section 1110, favorites section 1115, and recommended section 1120 may include one or more user selectable elements, when selected by user 108, may cause dispensing device to dispense a beverage that may correspond to the selected user selectable element.

User selectable elements in limited time offer section 1105 may correspond to beverages, brands, or beverage recipes that may be designated by an operator of dispensing device 104. User selectable elements in limited time offer section 1105 may correspond to beverages that may or may not comprise brand offerings. User selectable elements in limited time offer section 1105 may correspond to mixes of one or more brand offerings, beverage bases, beverage base components, flavors, diluents, and/or sweeteners. For example, the operator of dispensing device 104 may comprise a movie theater that is promoting a particular movie. Consequently, a user selectable element in limited time offer section 1105 may correspond to a beverage related to the promoted movie. In particular, a user selectable element in limited time offer section 1105 may correspond to a beverage related to a beverage consumed in the promoted movie. As another example, the operator of dispensing device 104 may comprise a restaurant that is promoting a particular food offering. Consequently, a user selectable element in limited time offer section 1105 may correspond to a beverage related to the promoted food offering. In particular, a user selectable element in limited time offer section 1105 may correspond to a beverage that may enhance or otherwise be related to the promoted food offering.

User selectable elements in custom mixes section 1110 may correspond to beverage recipes that user 108 may have designed or otherwise obtained. In other words, user selectable elements in custom mixes section 1110 may correspond to beverages that may not comprise brand offerings, but may comprise mixes of one or more brand offerings, beverage bases, beverage base components, flavors, diluents, and/or sweeteners. Recipes for beverages displayed in custom mixes 1110 may be stored and obtained by dispensing device 104 from preference data 114.

User selectable elements in favorites section 1115 may correspond to brand beverage offerings that user 108 may select most often or has other wise designated as favorite beverages. The identification of beverages displayed in favorites section 1115 may be stored in preference data 114.

User selectable elements in recommended section 1120 may correspond to beverage offerings that an operator of a dispensing device wishes to offer or otherwise suggest that user 108 consume. The recommended beverage offerings corresponding to recommended section 1120 may be determined or otherwise calculated based upon user 108's custom mixes and favorites identified in preference data 114. For example, application 130 (running on dispensing device 104) or application 136 (running on server 106) may run a recommendation process that may calculate beverage recommendations for recommended section 1120 based upon user 108's preference data 114 (e.g., user 108's custom mixes and/or favorites). After dispensing device 104 displays, in response to receiving event notification 142, customized user interface 1100 in stage 430, method 400 may then end at stage 440.

Consistent with embodiments of the disclose, the operator of dispensing device 104 may be able to select when customized user interface 1100 may be displayed on display 124 and/or which sections of user interface 1100 may be displayed on display 124. For example, the choices provided by customized user interface 1100 my cause potential users of dispensing device 104 to backup and have to wait. This may cause business issues for the operator of dispensing device 104 who may wish to turn off the ability for dispensing device 104 to provide customized user interface 1100. Or the operator of dispensing device 104 may wish to turn off the ability for dispensing device 104 to provide customized user interface 1100 during certain time periods and to turn on the ability for dispensing device 104 to provide customized user interface 1100 during other time periods. For example, for on-peak time periods, the operator may wish to turn off customized user interface 1100 in order to improve operational efficiency. However, during off-pear time periods, the operator may wish to turn on customized user interface 1100 because it may drive business in because consumers may wish to engage with customized user interface 1100.

Figure 12:
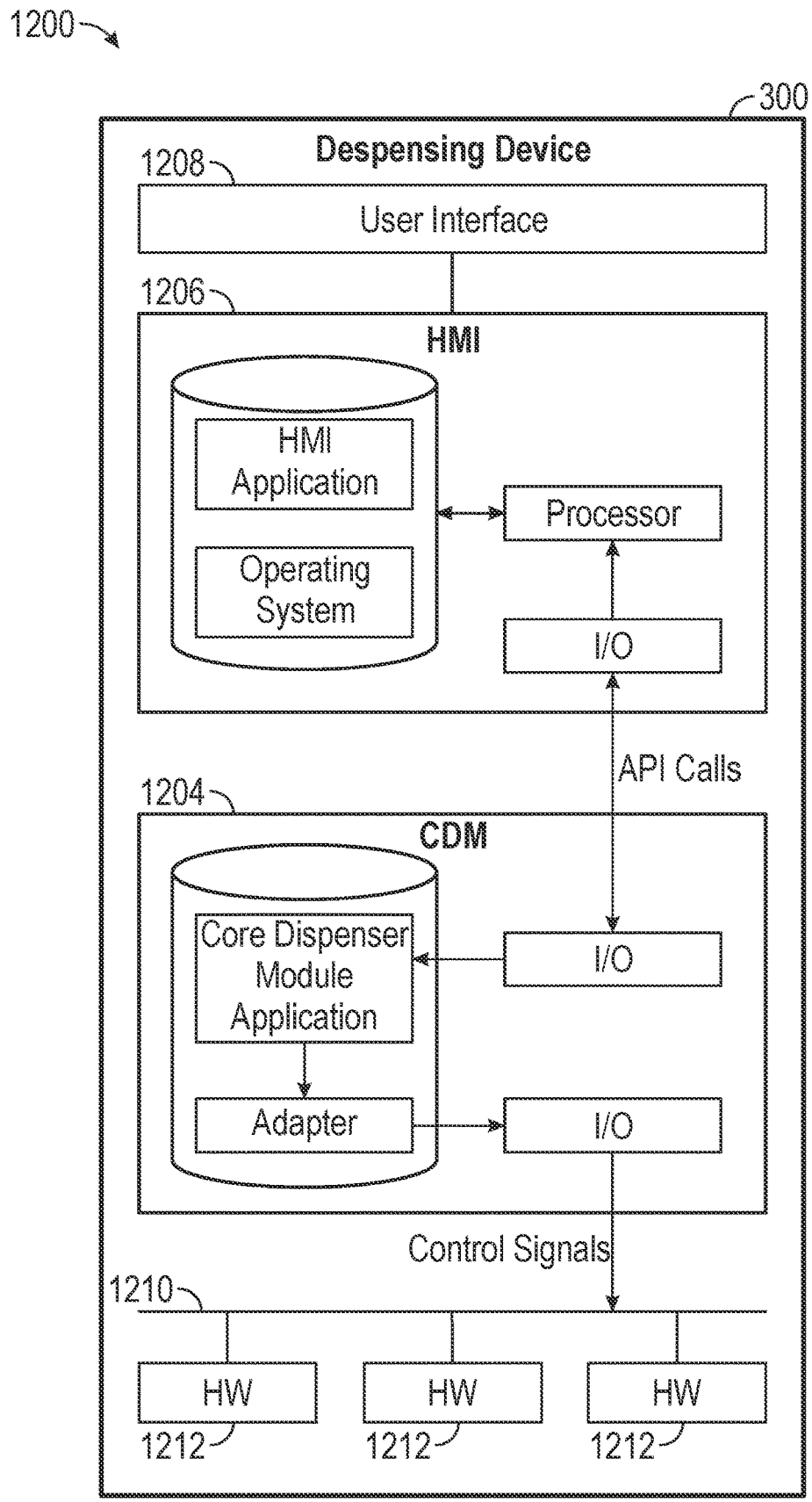
FIG. 12 shows a control architecture.

FIG. 12 shows a control architecture 1200 that may be used to control, for example, dispensing device 300 of FIG. 3. As shown in FIG. 12, control architecture 1200 may comprise a core dispense module (CDM) 1204, a human machine interface (HMI) module 1206, a user interface (UI) 1208, and a machine bus (MBUS) 1210. HMI 1206 may connect to or otherwise interface and communicate with at least one external device (e.g., mobile computing device 102) being external to dispensing device 300. HMI 1206 may also control and update display screens on UI 1208. CDM 1204 may control flows from a plurality of pumps and/or valves 1212 in dispensing device 300 according to a recipe to mix and dispense a product (e.g., a beverage) from dispensing device 300.

Beverage components (i.e., beverage bases or beverage base components and flavors) may be combined, along with other ingredients, to dispense various products that may include beverages or blended beverages (i.e., finished beverage products) from dispensing device 300. However, dispensing device 300 may also be configured to dispense beverage components individually. Dispensing device 300 may be configured to dispense beverage base components to form a beverage base or finished beverage. The other beverage ingredients may include diluents such as still or carbonated water, functional additives, or medicaments, for example.

An example of control architecture 1200 for dispensing device 300 may be described in U.S. Ser. No. 61/987,020, entitled "Dispenser Control Architecture", filed on May 1, 2014, the entirety of which is hereby incorporated by reference. MBUS 1210 may facilitate communication between HMI module 1206 and CDM 1204. HMI module 1206, MBUS 1210, and CDM 1204 may collectively comprise common core components, implemented as hardware or as combination of hardware and software, which may be adapted to provide customized functionality in dispensing device 300. Dispensing device 300 may further include memory storage and a processor. Examples of UI 1208 may be described in U.S. Ser. No. 61/877,549, entitled "Product Categorization User Interface for a Dispensing Device", filed on Sep. 13, 2013, the entirety of which is hereby incorporated by reference.

UI 1208 may detect what area of a touch screen has been touched by a user (e.g., user 108). In response, UI 1208 may send HMI module 1206 data regarding where the touch screen was touched. In response, HMI module 1206 may interpret this received data to determine whether to have UI 1208 display a different UI screen or to issue a command to CDM 1204. For example, HMI module 1206 may determine that the user touched a portion of the touch screen corresponding to a beverage brand. In response, HMI module 1206 may issue a command to CDM 1204 to pour the corresponding beverage brand. Or HMI module 1206 may determine that the user touched a portion of the touch screen corresponding to a request for another screen. In response, HMI module 1206 may cause UI 1208 to display the requested screen.

In some embodiments, UI 1208 in dispensing device 300 may be utilized to select and individually dispense one or more beverages. The beverages may be dispensed as beverage components in a continuous pour operation whereby one or more selected beverage components continue to be dispensed while a pour input is actuated by a user or in a batch pour operation where a predetermined volume of one or more selected beverage components are dispensed (e.g., one ounce at a time). UI 1208 may be addressed via a number of methods to select and dispense beverages. For example, a user may interact with UI 1208 via touch input to navigate one or more menus from which to select and dispense a beverage. As another example, a user may type in a code using an onscreen or physical keyboard (not shown) on dispensing device 300 to navigate one or more menus from which to select and dispense a beverage.

UI 1208, which may include a touch screen and a touch screen controller, may be configured to receive various commands from a user (i.e., consumer input) in the form of touch input, generate a graphics output and/or execute one or more operations with dispensing device 300 (e.g., via HMI module 1206 and/or CDM 1204), in response to receiving the aforementioned commands. A touch screen driver in HMI module 1206 may be configured to receive the consumer or customer inputs and generate events (e.g., touch screen events) that may then be communicated through a controller to an operating system of HMI module 1206.

Dispensing device 300 may be in communication with one or more external device (e.g., mobile computing device 102). In some embodiments, the communication between dispensing device 300 and the external device may be accomplished utilizing any number of communication techniques including, but not limited to, near-field wireless technology such as BLUETOOTH, Wi-Fi and other wireless or wireline communication standards or technologies, via a communication interface.

Figure 13:
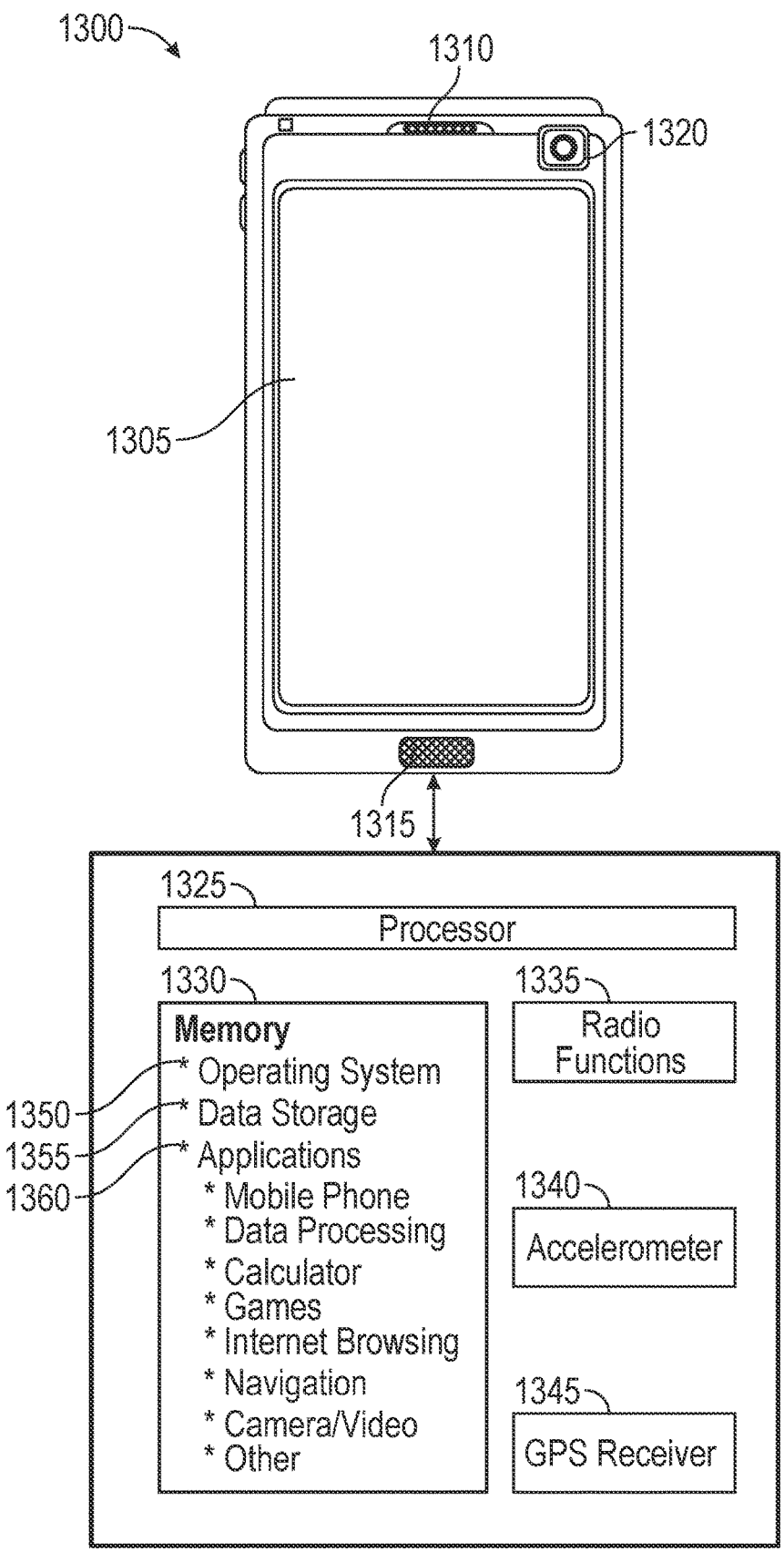
FIG. 13 shows a mobile computing environment.

FIG. 13 shows a mobile computing environment 1300 that mobile computing device 102 may operate within. For example, mobile computing environment 1300 may comprise, but is not limited to, a smartphone, a tablet personal computer, or a laptop computer. Mobile computing environment 1300 may comprise a handheld computer having both input elements and output elements. Input elements may include touch screen display 1305 that may allow the user to enter information into mobile computing environment 1300, a microphone 1315, and a camera 1320. Mobile computing environment 1300 may incorporate additional input elements such as a physical keypad (not shown). A soft keypad (not shown) may also be generated on touch screen display 1305.

Touch screen display 1305 on mobile computing device 1400 may also comprise an output element that can display a graphical user interface (GUI). Other output elements include a speaker 1310. Additionally, mobile computing environment 1300 may incorporate a vibration module (not shown), which may cause mobile computing environment 1300 to vibrate to notify the user of an event. Mobile computing environment 1300 may incorporate a headphone jack (not shown) for providing output signals.

Mobile computing environment 1300 may comprise a number of other components. The components may include a processor 1325, a memory 1330, radio functions 1335, an accelerometer 1340, and a GPS receiver 1345. Memory 1330 may be utilized for storing an operating system 1350 and may include a data storage 1355. Memory 1330 may also include a number of applications 1360 including, but not limited to, a mobile phone application, a data processing application, a calculator, games, an Internet browser, navigation a camera/video application and other applications such as application 110 that may be utilized for facilitating an individualized interaction with dispensing device 104 as discussed above. Radio functions 1335 may support short range wireless communications via NFC, BLUETOOTH wireless technology, BLUETOOH LOW ENERGY (BLE) wireless technology, Wi-Fi, or other wireless technologies. Radio functions 1335 may also be utilized to connect to the Internet (or other types of networks) as well as to remote computing systems.

Figure 14:
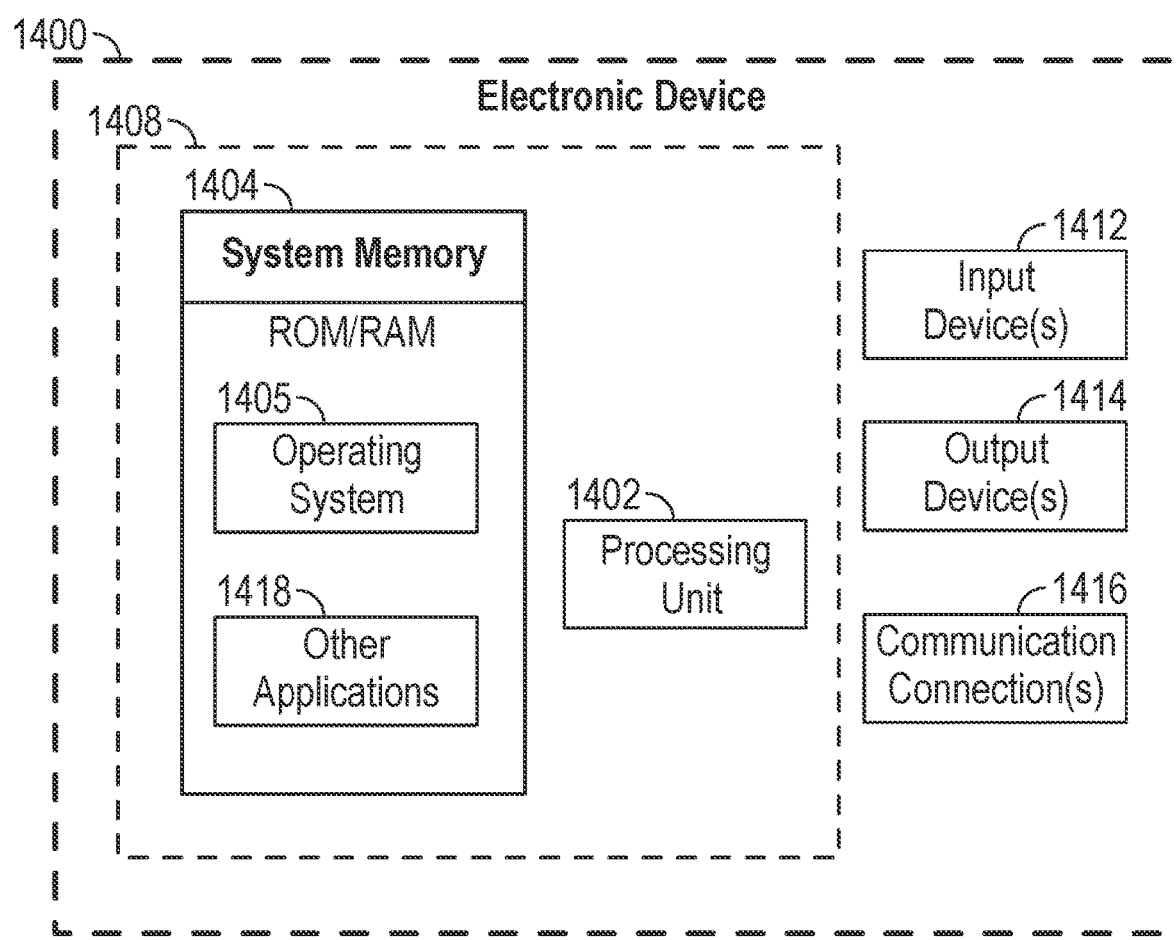
FIG. 14 shows an electronic device.

FIG. 14 shows electronic device 1400 that may provide an operating environment for dispensing device 104 or server 106 for example. Electronic device 1400 may comprise a computing device that may include at least one processing unit 1402 and a system memory 1404. Depending on the configuration and type of computing device, system memory 1404 may comprise, but is not limited to, volatile (e.g., random access memory (RAM)), non-volatile (e.g., read-only memory (ROM)), flash memory, or any combination. System memory 1404 may include an operating system 1405 and other applications 1418. Operating system 1405 may be suitable for controlling electronic device 1400's operation.

Electronic device 1400 may have additional features or functionality. For example, electronic device 1400 may also include additional data storage devices (not shown) that may be removable and/or non-removable such as, for example, magnetic disks, optical disks, solid state storage devices (SSD), flash memory or tape. Electronic device 1400 may also have input device(s) 1412 such as a keyboard, a mouse, a pen, a sound input device (e.g., a microphone), a touch input device, etc. Output device(s) 1414 such as a display, speakers, a printer, etc. may also be included. The aforementioned devices are examples and others may be used. Communication connection(s) 1416 may also be included and utilized to connect to the Internet (or other types of networks) as well as to remote computing systems.

Embodiments, for example, may be implemented as a computer process (method), a computing system, or as an article of manufacture, such as a computer program product or computer readable media. The computer program product may be a computer storage media readable by a computer system and encoding a computer program of instructions for executing a computer process.

Computer readable media may include computer storage media. Computer storage media may include volatile and nonvolatile, removable and non-removable media implemented in any method or technology for storage of information (such as computer readable instructions, data structures, program modules, or other data) in hardware. System memory 1404 (as well as memory 1330) may be an example of computer storage media (e.g., memory storage). Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium that can be used to store information.

Computer readable media may also include communication media. Communication media may be embodied by computer readable instructions, data structures, program modules, or other data in a modulated data signal, such as a carrier wave or other transport mechanism, and includes any information delivery media. Modulated data signal may describe a signal that may have one or more characteristics set or changed in such a manner as to encode information in the signal. Communication media may include wired media such as a wired network or direct-wired connection, and wireless media such as acoustic, radio frequency (RF), infrared, and other wireless media.

A beverage may include, but is not limited to, pulp and pulp-free citrus and non-citrus fruit juices, fruit drink, vegetable juice, vegetable drink, milk, soy milk, protein drink, soy-enhanced drink, tea, water, isotonic drink, vitamin-enhanced water, soft drink, flavored water, energy drink, coffee, smoothies, yogurt drinks, hot chocolate and combinations thereof. The beverage may also be carbonated or non-carbonated. The beverage may comprise beverage components (e.g., beverage bases, colorants, flavorants, and additives).

A beverage base may comprise parts of the beverage or the beverage itself prior to additional colorants, additional flavorants, and/or additional additives. Beverage bases may include, but are not limited to syrups, concentrates, and the like that may be mixed with a diluent such as still or carbonated water or other diluent to form a beverage. The beverage bases may have reconstitution ratios of about 3:1 to about 6:1 or higher. Beverage bases may comprise a mixture of beverage base components.

A beverage base component may be included in beverage bases. The beverage base component may comprise parts of beverages that may be considered food items by themselves. The beverage base components may be micro-ingredients such as an acid portion of a beverage base, an acid-degradable and/or non-acid portion of a beverage base, natural and artificial flavors, flavor additives, natural and artificial colors, nutritive or non-nutritive natural or artificial sweeteners, additives for controlling tartness (e.g., citric acid or potassium citrate), functional additives such as vitamins, minerals, or herbal extracts, nutraceuticals, or medicaments. The micro-ingredients may have reconstitution ratios from about 10:1, 20:1, 30:1, or higher with many having reconstitution ratios of 50:1 to 300:1. The viscosities of the micro-ingredients may range from about 1 to about 100 centipoise.

Thus, for the purposes of requesting, selecting, or dispensing a beverage base, a beverage base formed from separately stored beverage base components may be equivalent to a separately stored beverage base. For the purposes of requesting, selecting or dispensing a beverage, a beverage formed from separately stored beverage components may be equivalent to a separately stored beverage.

Separately stored may comprise that the components may be kept separate until combined. For instance, the components may be separately stored individually in a container or package or instead may be all stored in one container or package wherein each component is individually packaged (e.g., plastic bags) so that they do not blend while in the container or package. The container or package, itself, may be individual, adjacent to, or attached to another container or package. A blended beverage may include final products wherein two or more beverages have been blended or mixed or otherwise combined to form a final product.

The product ingredients may include beverage bases or beverage base components (e.g., concentrated syrups) as well as flavors (i.e., flavoring agents, flavor concentrates, or flavor syrups), which may be separately stored or otherwise contained in individual removable containers. Each of the beverage bases or beverage base components and each of the flavors may be separately stored or otherwise contained in individual removable containers, cartridges, packages or the like that may generally be referred to simply as a package or ingredients package.

Embodiments are described above with reference to block diagrams and/or operational illustrations of methods, systems, and computer program products. The operations/acts noted in the blocks may be skipped or occur out of the order as shown in any flow diagram. For example, two or more blocks shown in succession may be executed substantially concurrently or the blocks may sometimes be executed in the reverse order, depending upon the functionality/acts involved. While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments.

What is claimed is:

1. A method comprising:
   transmitting, by a dispensing device, a wireless signal from the dispensing device, the wireless signal including a device identification of the dispensing device;
   receiving, at the dispensing device, an event notification, the event notification associated with a mobile device that received the wireless signal in close proximity to the dispensing device;
   displaying, in response to the event notification, a customized user interface, the customized user interface based on preference data or profile data included in the event notification, the preference data or profile data associated with a user of the mobile device;
   directly connecting, by the dispensing device, via a first wireless connection with the mobile device, the first wireless connection configured to exchange data between the dispensing device and the mobile device, wherein the dispensing device comprises a first access point for establishing the first wireless connection; and
   sending, by the dispensing device, second connection data to the mobile device, the second connection data comprising credentials for establishing a second wireless connection with a second access point.

2. The method of claim 1, wherein the wireless signal is transmitted from the dispensing device at a range not greater than 48 inches from the dispensing device.

3. The method of claim 1, wherein the device identification comprises data indicating a type of the dispensing device and data indicating a location of the dispensing device.

4. The method of claim 1, further comprising:
   receiving, by a server in communication with the dispensing device, a communication from the mobile device including at least a portion of the device identification and a user identification (ID) associated with the user of the mobile device; and
   transmitting, by the server, the event notification to the dispensing device, the event notification comprising the preference data or profile data corresponding to the user identified by the user ID.

5. The method of claim 1, further comprising:
   receiving, by the dispensing device over the first wireless connection, the event notification from the mobile device, the event notification comprising the preference data or profile data corresponding to the user of the mobile device.

6. The method of claim 1, wherein the second wireless connection is established with a wireless communication protocol that is the same as that used to establish the first wireless connection.

7. A method comprising:
   receiving, by a mobile computing device, a device identification when the mobile computing device is in close proximity to a dispensing device;
   obtaining, by the mobile computing device, first connection data for connecting to the dispensing device based on the device identification;
   creating, by the mobile computing device, a first connection with the dispensing device based on the first connection data;
   transmitting, by the mobile computing device over the first connection, an event notification to the dispensing device, the event notification comprising preference data or profile data corresponding to a user of the mobile computing device;
   obtaining, by the mobile computing device from the dispensing device, second connection data for connecting to a server;
   creating, by the mobile computing device, a second connection with the server; and
   receiving, by the mobile computing device over the second connection, promotional data.

* * * * *